United States Patent [19]

Grey

[11] 4,182,202
[45] Jan. 8, 1980

[54] OVERDRIVE ATTACHMENT FOR A MOTOR VEHICLE

[76] Inventor: James S. Grey, Monk Hill Rd., Box 107 A, East Otto, N.Y. 14029

[21] Appl. No.: 757,628

[22] Filed: Jan. 7, 1977

[51] Int. Cl.² ............................................. F16H 57/10
[52] U.S. Cl. .................................................. 74/781 R
[58] Field of Search ................ 74/781 R, 750 R, 801, 74/339; 192/53 R, 53 B

[56] References Cited
U.S. PATENT DOCUMENTS 3,426,623 2/1969 Abbott .......................... 192/53 R X
3,552,531 1/1971 Grosseau .......................... 74/339 X

FOREIGN PATENT DOCUMENTS 679190 9/1952 United Kingdom .................. 74/781 R Primary Examiner—C. J. Husar
Assistant Examiner—Frank H. McKenzie, Jr.
Attorney, Agent, or Firm—Bean, Kauffman & Bean

[57] ABSTRACT

An overdrive attachment of the type employing an epicyclic gear train features an improved arrangement for selectively providing direct drive and overdrive connections between the input and output drive shafts of the attachment.

3 Claims, 2 Drawing Figures

OVERDRIVE ATTACHMENT FOR A MOTOR VEHICLE

BACKGROUND OF THE INVENTION

It has heretofore been proposed, as evidenced by U.S. Pat. No. 3,426,623, to provide an overdrive device for a motor vehicle, which includes a stationary housing; an input drive shaft; an output drive shaft; an epicyclic gear train comprising a sun gear journaled upon the input shaft, a planetary gear device meshing with the sun gear and fixed for rotation with the input shaft and a ring gear device meshing with the planetary gear device and fixed for rotation with the output shaft; and means for selectively fixing the sun gear to the planetary gear device to cause rotation thereof with the input shaft and to the stationary housing to prevent rotation thereof with the input shaft, whereby to provide direct drive and overdrive connections between the input and output shafts, respectively. More specifically, this prior type of overdrive device employs a control member in the form of a collar, which is spline connected to the sun gear for relative axial movement alternatively into sun gear locking engagement with axially spaced toothed couplings carried on the planetary gear device and the stationary housing. Coupling of the collar with these toothed couplings is facilitated by employing a pair of synchronizer rings arranged one in association with each of such toothed couplings.

A drawback of prior overdrive devices of the type employing an epicyclic gear train is that the sun gear and control member must be accelerated/decelerated between rotational speeds of zero and that speed corresponding to rotational speed of the input shaft each time a change is made in the connection between the input and output shafts.

SUMMARY OF THE INVENTION

The present invention is generally directed towards an overdrive attachment for motor vehicles and more particularly towards an improvement in an overdrive mechanism of the type employing an epicyclic gear train, which avoids reduction of rotational speed of any rotary element to zero incident to change between direct drive and overdrive conditions.

More specifically, in a preferred form of the present invention a sun gear of an epicyclic gear train is non-rotatably fixed to the stationary casing of the overdrive attachment and a control member is employed to selectively connect an output shaft directly to an input shaft or a ring gear device of the gear train to provide for direct drive and overdrive connections, respectively, between the input and output drive shafts. The present construction employs a single synchronizer ring to facilitate coupling of the control member with both the input shaft and the ring gear device.

DRAWINGS

The nature and mode of operation of the present invention will now be more fully described in the following detailed description taken with the accompanying drawing wherein:

FIG. 1 is a sectional view taken through an overdrive attachment formed in accordance with the present invention, and showing the attachment in a direct drive condition; and FIG. 2 is a sectional view, which is taken generally along the line 2—2 in FIG. 1, but showing the attachment in an overdrive condition.

DETAILED DESCRIPTION

Figure 1:
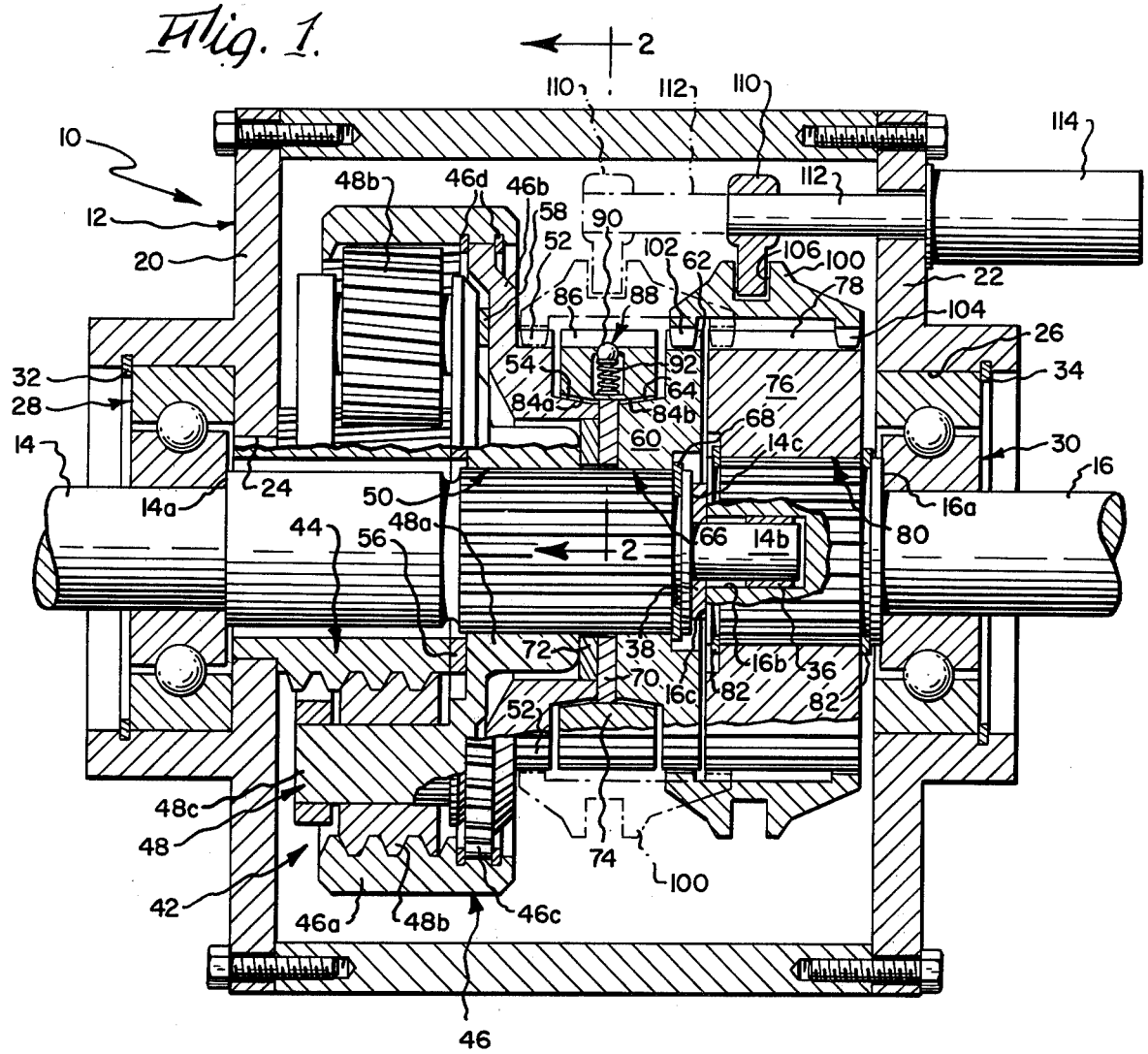

Reference is now made to FIG. 1, wherein an overdrive attachment formed in accordance with the present invention is generally designated as 10 and shown as including a casing 12, which may be suitably non-rotatably fixed to a vehicle, not shown; an input drive shaft 14, which may be suitably coupled to or comprise an integral part of a conventional transmission drive shaft, not shown; and an output drive shaft 16, which may be suitably coupled to or comprise an integral part of an input shaft of a conventional rear or front axial differential, also not shown. It will be understood that the specific placement of attachment 10 within the drive train of a vehicle and the mode of fixing same to such vehicle are matters of choice and form no part of the present invention.

In the illustrated form of the invention, casing 12 is of a tubular construction and has its opposite ends closed by suitably secured, circular end plates 20 and 22 formed with axially aligned openings 24 and 26 adapted to receive bearing devices 28 and 30 and snap ring retainers 32 and 34, respectively. Bearing devices 28 and 30 serve to journal input and output shafts 14 and 16, and engage with shaft shoulder enlargement 14a and 16a for the purpose of releasably retaining a reduced diameter end portion 14b of the input shaft seated within an axially extending bore opening 16b of the output shaft. Preferably, a suitable bearing device 36 is fitted within bore opening 16b for the purpose of journaling end portion 14b and cooperating with bearing devices 28 and 30 for maintaining the input and output shafts in axial alignment; and a suitable thrust washer 38 is arranged intermediate facing radially extending surfaces 14c and 16c of such shafts to accommodate for axially directed thrust loading conditions thereon.

Attachment 10 additionally includes an epicyclic gear train which is generally designated as 42 and shown in FIG. 1 as including a sun gear 44, a ring gear device 46 and a planetary gear device 48. In accordance with a preferred form of the present invention, sun gear 44 is non-rotatably fixed to end plate 20, as by welding, and arranged concentrically outwardly of input shaft 14; ring gear device 46 is of multi-part construction including a ring gear element 46a, non-rotatably fixed to a hub portion 46b, as by a spline device 46c and snap ring retainers 46d; and planetary gear device 48 is of a multi-part construction including a hub portion 48a non-rotatably fixed to input shaft 14 as by a spline device 50, and a plurality of helical gears 48b journaled for rotation relative to hub portion 48a on a plurality of pin shafts 48c and arranged to continuously mesh with sun gear 44 and ring gear element 46a. Further, ring gear hub portion 46b is formed with a first toothed coupling 52 and a frusto-conically shaped clutch surface 54; and planetary gear hub portion 48a is spaced axially relative to sun gear 44 and ring gear hub portion 46b by bearing devices 56 and 58, respectively.

The inner end of input shaft 14 is shown in FIG. 1 as being provided with a radial enlargement 60 shaped to define a second toothed coupling 62, which is axially aligned with toothed coupling 52, and a frusto-conically shaped clutch surface 64, which is arranged in an aligned, facing relationship with clutch surface 54. Preferably, enlargement 60 is formed separately from the input shaft and keyed for rotation therewith by means of a spline device 66. Movement of enlargement 60 axially of the input shaft may be constrained by snap ring retainer 68 and a pair of axially aligned thrust washers 70 and 72. It will be noted that thrust washer 72 is disposed concentrically intermediate and in annular surface engagement with input shaft 14 and ring gear hub portion 46b and for radial surface engagement with planetary gear hub portion 48a and thrust washer 70, whereas thrust washer 70 is disposed concentrically intermediate and in annular surface engagement with the input shaft and a synchronizer ring 74 and for radial surface engagement with ring gear hub portion 46b and enlargement 60 in addition to thrust washer 72. Thus, it will be apparent that thrust washers 70 and 72 are operable to constrain synchronizer ring 74 and ring gear hub portion 46b, respectively, against movement radially of input shaft 14.

The inner end of output shaft 16 is also formed with a radial enlargement 76, which is shaped to define annular teeth or spline device 78. Preferably, enlargement 76 is formed separately from the output shaft and keyed for rotation therewith by means of a spline device 80. Movement of enlargement 76 axially of the output shaft may be constrained by a pair of snap ring retainers 82.

Previously mentioned synchronizer ring 74 is characterized as having its radially inner surface shaped to define a pair of spaced, frusto-conically shaped cam surfaces 84a and 84b, which diverge in axially opposite directions and are shaped to cooperatively engage with cam surfaces 54 and 64, respectively.

Figure 2:
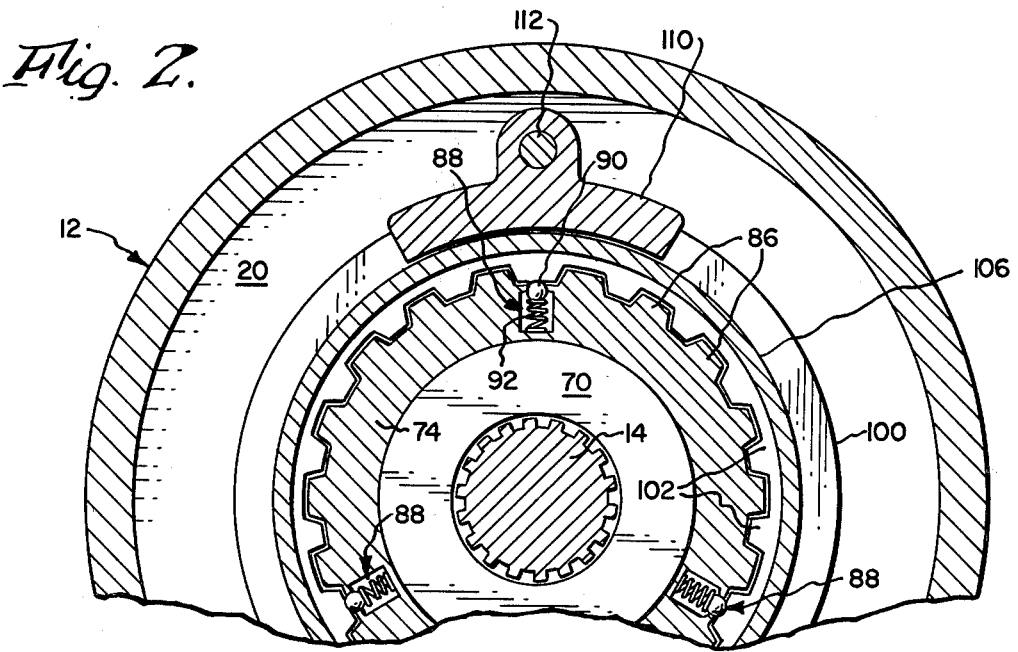

Preferably, synchronizer ring 74 would be sized to prevent its oppositely facing radially extending surfaces from engaging with facing surfaces of ring gear hub member 46b and enlargement 60 when its cam surfaces 84a and 84b are disposed in operative engagement with cam surfaces 54 and 64, respectively. Synchronizer ring 74 is also formed with a toothed coupling 86 corresponding in shape and number of teeth to couplings 52 and 62, and one or more detent assemblies 88, which preferably include a ball detent 90 and a coil spring device 92 operable to bias ball detent 90 to protrude outwardly between adjacent teeth 86 into the positions shown in FIGS. 1 and 2.

Again referring to FIGS. 1 and 2, it will be understood that attachment 10 additionally includes a movable operator member in the form of a collar 100, which is characterized as having its radially inner surface formed with a toothed coupling 102 spaced axially from a spline device or teeth 104 and its radially outer surface formed with an annular slot 106. Slot 106 is sized to slidably receive a "fork" shaped device 110, which is fixed to a rod 112 supported for axial reciprocating movements under the control of a solenoid 114 or other suitable vehicle driver controlled operator.

It will be understood that teeth 78 and 104 cooperate to fix collar 100 for rotation with output drive shaft 16, while permitting relative axial movement of the collar and thus its "movable" toothed coupling 102 between the full and broken line position shown in FIG. 1 to provide direct drive and overdrive or epicyclic drive ratio connections, respectively, between input and output drive shafts 14 and 16. Thus, when collar 100 is disposed in its direct drive position, movable tooth coupling 102 is arranged to mesh with second toothed coupling 62, whereas when the collar is disposed in its overdrive position, the movable toothed coupling is arranged to mesh with first toothed coupling 52.

It will be understood that synchronizer ring 74 serves to inhibit non-synchronous engagement of movable toothed coupling 102 with toothed couplings 62 and 52, as collar 100 is reciprocated or passed between its directed drive and overdrive positions. More specifically, during passage of collar 110 between its above described positions, movable toothed coupling 102 initially engages with toothed coupling 86 to lock ring 74 for rotation with output shaft 16 and then moves into momentary deforming engagement with detent assemblies 88 to effect axial displacements of ring 74, as required to force clutch surfaces 84a and 84b alternately into operative engagement with complimentary clutch surfaces 54 and 64. As will be apparent, engagement of clutch surface 84a with clutch surface 54 serves to increase the rotation speed of ring 74 and thus output shaft 16 to correspond to that of ring gear hub portion 46b immediately prior to engagement of movable toothed coupling 102 with toothed coupling 52, whereas engagement of clutch surface 84b with clutch surface 64 serves to decrease the rotational speed of ring 74 and thus output shaft 16 to correspond to that of input shaft 14 immediately prior to engagement of the movable toothed coupling with toothed coupling 62. After passage of movable toothed coupling 102 from deforming engagement with detent assemblies 88, ring 74 tends to return to its "centered" position illustrated in FIG. 1, wherein its clutch surfaces are spaced from engagement with clutch surfaces 54 and 64.

While the present invention has been specifically described in connection with its use in a vehicle overdrive device, it will be understood that such invention possesses utility in any speed change mechanism, wherein it is desired to selectively provide a direct drive and epicyclic drive ratio connection between first and second rotatable elements.

I claim:

1. In an overdrive attachment for a motor vehicle including a non-rotatable casing; a rotatable input drive shaft; a rotatable output drive shaft; an epicyclic gear train including a sun gear; a planetary gear device meshing with said sun gear and fixed for rotation with said input drive shaft and a ring gear device meshing with said planetary gear device and supported for rotation relative to said input drive shaft; ; a first toothed coupling rotatively fast with said ring gear device; a second toothed coupling rotatively fast with said input drive shaft; and a vehicle operator controlled, axially movable toothed coupling fixed for rotation with said output drive shaft and arranged coaxial with said first and second toothed couplings, said axially movable toothed coupling being alternatively engageable with said first and second toothed couplings to provide for overdrive and direct drive connection conditions between said input and output shafts, respectively, the improvement comprising in combination:

said sun gear is fixed against rotation relative to said casing during both said overdrive and direct drive connection conditions and a synchronizing means is arranged operatively between said first and second toothed couplings to inhibit nonsynchroneous engagement of said axially movable toothed coupling therewith.

2. The improvement according to claim 1, wherein said synchronizing means includes a synchronizer ring having axially oppositely facing clutch surfaces arranged for alternative engagement with complementary clutch surfaces carried by said ring gear device and said input drive shaft and having a toothed coupling engageable by said axially movable toothed coupling incident to passage thereof alternatively into engagement with said first and second toothed coupling, and resilient detent means carried by said ring intermediate at least certain adjacent teeth of said toothed coupling thereof, said detent means being deformably engageable by said axially movable toothed coupling incident to said passage thereof for effecting axial displacements of said ring to force said oppositely facing clutch surfaces alternatively into engagement with said complementary clutch surfaces.

3. In a change-speed mechanism comprising in combination: a first rotatable element; a second rotatable element; an epicyclic gear train including a sun gear, a planetary gear device meshing with said sun gear and fixed for rotation with said first element and a ring gear device meshing with said planetary gear device and supported for rotation relative to said first element; first and second toothed couplings arranged in axial alignment and rotatively fast to said ring gear device and said first element, respectively; a member fixed for rotation with and movement axially of said second element between first and second positions, said member having a toothed coupling alternatively engageable with said first and second toothed couplings upon axial movement of said member into said first and second positions to effect epicyclic drive and direct drive ratio connection coditions, respectively, between said first and second elements, respectively, the improvement comprising in combination:

said sun gear being fixed against rotation during both epicyclic drive and direct drive ratio connection conditions; and synchronizing means arranged operatively between said first and second toothed couplings for inhibiting nonsynchronous engagement of said toothed coupling of said member therewith.

* * * * *